(12) United States Patent
Lee

(10) Patent No.: US 9,002,639 B2
(45) Date of Patent: Apr. 7, 2015

(54) METHOD FOR PERFORMING MAP MATCHING IN USER TERMINAL

(71) Applicant: Hyundai MNSoft, Inc., Seoul (KR)

(72) Inventor: Seok Ho Lee, Seoul (KR)

(73) Assignee: Hyundai MNsoft, Inc., Seoul (KR)

( * ) Notice: Subject to any disclaimer, the term of this patent is extended or adjusted under 35 U.S.C. 154(b) by 0 days.

(21) Appl. No.: 14/066,790

(22) Filed: Oct. 30, 2013

(65) Prior Publication Data

US 2014/0372024 A1 Dec. 18, 2014

(30) Foreign Application Priority Data

Jun. 14, 2013 (KR) ........................ 10-2013-0068468

(51) Int. Cl.
*G01C 21/00* (2006.01)
*G01C 21/20* (2006.01)
*G01C 21/30* (2006.01)

(52) U.S. Cl.
CPC ............ *G01C 21/005* (2013.01); *G01C 21/206* (2013.01); *G01C 21/30* (2013.01)

(58) Field of Classification Search
USPC ................. 701/400, 446–447, 454, 467–468; 340/988, 995.1
See application file for complete search history.

(56) References Cited

U.S. PATENT DOCUMENTS

| 6,024,655 A | * | 2/2000 | Coffee ........................... 473/407 |
| 2010/0262359 A1 | * | 10/2010 | Motoyama .................... 701/200 |
| 2013/0238783 A1 | * | 9/2013 | Alexander et al. ............ 709/224 |

FOREIGN PATENT DOCUMENTS

| JP | 2002-318121 | 10/2002 |
| KR | 10-2010-0067578 | 6/2010 |

\* cited by examiner

*Primary Examiner* — Yonel Beaulieu
(74) *Attorney, Agent, or Firm* — Bacon & Thomas, PLLC

(57) ABSTRACT

A method for performing a map matching in a user terminal includes determining a space where the user terminal is located using positioning data that is measured at predetermined time intervals, searching one or more links that are located within a range of a preset distance from the space as a candidate link, selecting one of the candidate links which best meets at least one suitability criterion of at least two suitability criteria including distance suitability and space suitability, and carrying out the map matching with respect to the selected one candidate link.

8 Claims, 14 Drawing Sheets

FIG.5B

| TIME | NO. | POSITIONING DATA | SIMPLE DECISION (SPACE) |
|---|---|---|---|
| T1 | 1 | (x1,y1) | 6 |
| T2 | 2 | (x2,y2) | 6 |
| T3 | 3 | (x3,y3) | 6 |
| T4 | 4 | (x4,y4) | 1 |
| T5 | 5 | (x5,y5) | 6 |
| T6 | 6 | (x6,y6) | 6 |
| T7 | 7 | (x7,y7) | 6 |

FIG. 7B

| TIME | NO. | POSITIONING DATA | SIMPLE DECISION SPACE | SECTION DECISION SPACE | USER POSITION |
|------|-----|------------------|----------------------|------------------------|---------------|
| T1   | 1   | (x1,y1)          | 6                    | -                      | -             |
| T2   | 2   | (x2,y2)          | 6                    | -                      | -             |
| T3   | 3   | (x3,y3)          | 6                    | 6                      | (x3,y3)       |
| T4   | 4   | (x4,y4)          | 1                    | 6                      | (x3,y3)       |
| T5   | 5   | (x5,y5)          | 6                    | 6                      | (x5,y5)       |
| T6   | 6   | (x6,y6)          | 6                    | 6                      | (x6,y6)       |
| T7   | 7   | (x7,y7)          | 6                    | 6                      | (x7,y7)       |

METHOD FOR PERFORMING MAP MATCHING IN USER TERMINAL

RELATED APPLICATIONS

This application claims the benefit of Korean Patent Application No. 10-2013-0068468, filed on Jun. 14, 2013, which is hereby incorporated by reference as if fully set forth herein.

FIELD OF THE INVENTION

The present invention relates to a method for performing a map matching in a user terminal, and more particularly, to a method for performing a map matching to match onto a map a position of a user terminal measured using a positioning device.

BACKGROUND OF THE INVENTION

Navigation systems are generally mounted on vehicles and are used as terminal devices for vehicles that help drivers travel and reach his/her destination with ease by displaying a road map for the drivers or searching a route to the destination.

An automotive navigation system being currently widely used is an apparatus that identifies a current position of a car or a user in real time by calculating signals received from satellites using a Global Positioning System (referred to as 'GPS', hereinafter), converts relevant data in a database, which contains map information and traffic information built previously, corresponding to the current position into image/voice information in association with the database, and displays the converted image/voice.

The automotive navigation system includes a GPS receiver to calculate a current position of a car. The automotive navigation system obtains information on current speed, time and position of the car through the use of the GPS receiver and provides a user with navigation information based on such information.

However, when the current position using GPS signals is calculated, there normally occurs an error of tens of meters because of characteristics of the GPS signals. Therefore, when such an error is used to calculate the current position on a map, the current position may be erroneously displayed on a point out of a road, on a rooftop of a building or the like.

In order to resolve such a drawback, a typical automotive navigation system employs a map matching method when calculating a position of a car. According to the map matching method, a current position is compared to road data under an assumption that the car is driving on a road. When the difference between the current position and the road data falls within a predetermined range, the automotive navigation system determines that the car is driving along the relevant road and forcibly corrects the current position to a point on a road nearest to the current position.

Korean Laid-Open Patent Publication No. 10-2010-0067578 suggests an apparatus and method for map matching of a moving object. It discloses a map matching method to correct a position coordinate of a moving object such as a vehicle moving on a road, wherein a position of the moving object is corrected into a point on the road when coordinate data of the road does not exist on a map data and thus it is not easy to make a conventional map matching.

Japanese Laid-Open Patent Publication No. 2002-318121 discloses a navigation system, which is capable of determining a current position of a moving object when the moving object moves into an indoor facility. First, the navigation system determines a current position of the moving object by performing a map matching on an output data from a stand-alone sensor and an output data from a GPS apparatus using a map data while the moving object is moving. Thereafter, when it is detected that the current position of the moving object is located within an indoor facility, the navigation system performs a map matching on the output data from the stand-alone sensor using a map data to determine the current position of the moving object.

Generally, when a user terminal such as the automotive navigation system receives a positioning data or measures its current position, a position of a user is displayed by performing a map matching on the positioning data to network data (for example, such as a node or link) nearest to the position of the user. When performing the map matching, however, even in the case that the user is located indoors, especially, at a specific indoor space, the user terminal renders a positioning result to map-match to nearest network data. Accordingly, it is not possible to precisely reflect a real position of the user who is actually located indoors on the map.

SUMMARY OF THE INVENTION

In view of the above, the present invention provides a method to correctly reflect a real position of a user terminal on a map.

Further, the present invention provides a method to selectively perform a space matching or a network matching depending on a user selection.

Further, the present invention provides a method to perform a map matching to which a history of a map matching that has been performed already is reflected.

As set forth above, the embodiment of the present invention performs a map matching on a position of a user terminal that is measured by a position device to display the position on a map, whereby the position of a user terminal can be displayed on the map as compared to a conventional network-based map matching.

Further, it is possible to remove a temporary error issue caused by a positioning device by accumulating the positions of the user terminal for some period of time and determining a position of the user terminal at a current time using the accumulated positions of the user terminals for displaying it.

BRIEF DESCRIPTION OF THE DRAWINGS

The above and other objects and features of the present invention will become apparent from the following description of embodiments given in conjunction with the accompanying drawings, in which:

FIGS. 5A and 5B are respectively an exemplary diagram and a table explaining a simple decision in accordance with an embodiment of the present invention;

FIGS. 7A and 7B are respectively an exemplary diagram and a table illustrating an example how to make a section decision in a the user terminal;

DETAILED DESCRIPTION OF THE EMBODIMENTS

The above described and additional aspects of the present invention will be further apparent from the preferred embodiments explained with reference to accompanying drawings. Hereinafter, these embodiments of the present invention will be described in detail so that they can be readily apprehended implemented by those skilled in the art.

In the entire specification, when a portion "comprises" a constituent, it means that the portion does not exclude another constituent but further comprises other constituent if not described otherwise. Further, terms such as "unit", "apparatus", "module" and "block" mean a unit to process at least one of functions or operations, and they can be embodied by hardware or software or a combination of hardware and software.

An indoor map matching is a map matching that needs to comprehensively consider a space and a network due to the addition of a concept of a space to an existing network map matching. The term of "space" used herein means specific spatial extent divided by semantic usage such as a store, a dining room, a sensor coverage area, and so on.

A map matching in associated with the present invention is classified into a space map matching and a network map matching. The space map matching means to match a real position of a user terminal that is measured by a positioning device to a specific space area such as a store, a dining room, a part of corridor, whereas the network map matching means to match a position of a user terminal that is measured by the positioning device to a link or a node. The link or node refers to a point or position at which the position of the user terminal is set as a starting point in order to search a route to a destination, when the user terminal requests the route search. That is, the route search is started from not a real position of the measured user terminal but any one of the links or nodes.

Figure 1:
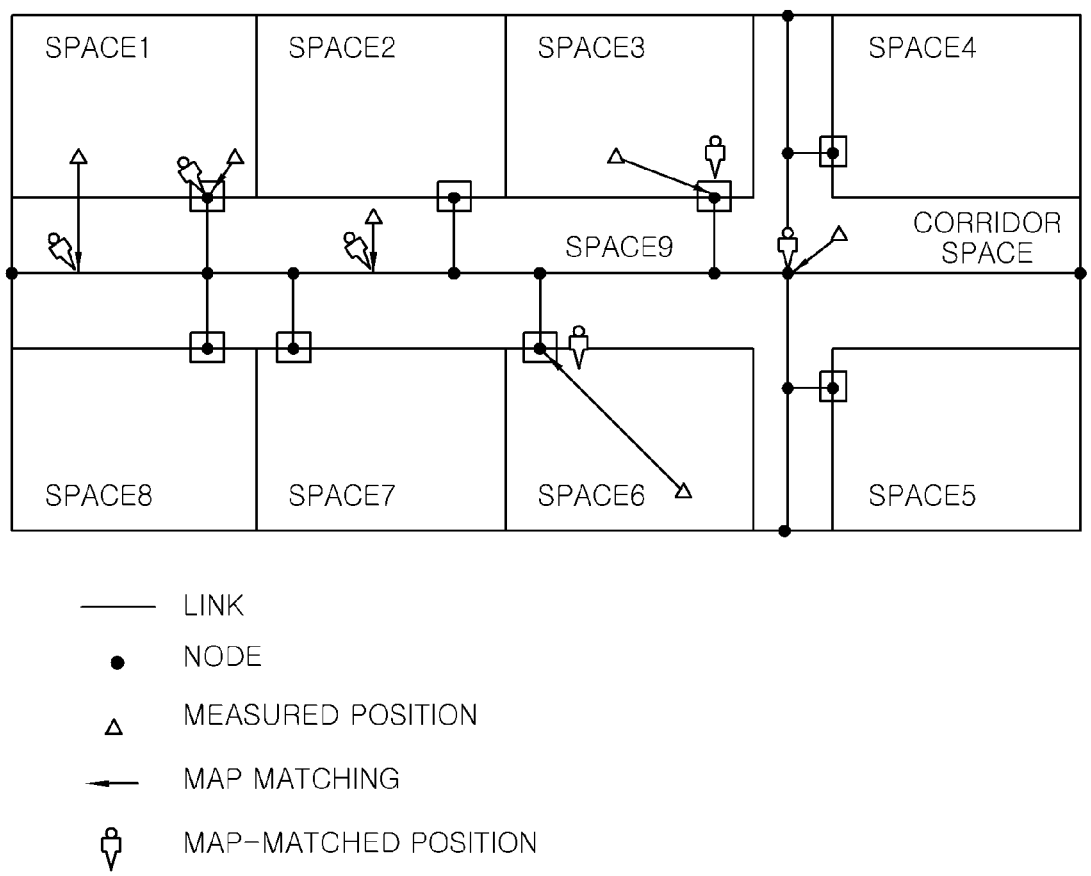
FIG. 1 is a view explaining a network map matching and a space map matching in accordance with an embodiment of the present invention.

FIG. 1 is a view explaining a network map matching and a space map matching in accordance with an embodiment of the present invention. Hereinafter, the network map matching and the space map matching in accordance with an embodiment of the present invention will be described in detail with reference to FIG. 1. Referring to FIG. 1, there is shown a plurality of spaces including SPACE 1, SPACE 2, SPACE 3, . . . , and SPACE 8, and SPACE 9 (which is represented by a corridor in FIG. 1) adjacent to each space. A space may be one space physically and also one space logically. That is, as shown in FIG. 1, while a set of SPACE1 to SPACE3 may be one space physically, each space may be one of three spaces which are logically divided from one physical space. Similarly, the corridor may be integrally one space or may be separated into desired number of spaces.

Each space includes an entry node intended to enter the space. The spaces SPACE 1 to SPACE 8 each include an entry node to enter each space.

Additionally, the corridor has a link. The link is a moving route of a user to guide the user along a searched route. For an outdoor environment, the link may be a road on which a vehicle moves, and for an indoor environment, the link may be a corridor through which a user accesses an entry node. Of course, a node may be placed on the link because one link consists of two nodes as illustrated in FIG. 1. Referring to FIG. 1, a node may be formed at a crossing point of links and an entry point of each space.

According to a related art, when a position of a user terminal is measured by a positioning device, the position of the user terminal is matched to a link. Whereas, the present invention is proposed to perform a space map matching as well as a network map matching in order to determine a correct position of the user terminal.

Hereinafter, the network map matching will be described first. As described above, the user terminal performs the network map matching when a route search is requested from the outside.

As illustrated in FIG. 1, a position of a user terminal measured by a positioning device is indicated by a triangle. When a task requested to the user terminal is a route search, the position of the user terminal is matched to an entry node constituting a link or a space. For example, in SPACE1, it can be shown that a position of a user terminal is matched to a link that is formed at an entry node or a link formed in a corridor. In each of SPACE3 and SPACE6, it can also be shown that a position of the user terminal is matched to an entry node within each space. In addition, when a position of the user terminal is at any one point in the corridor, it can be shown that the position of the user terminal is matched to a link formed in the corridor. As such, in accordance with the embodiment, the user terminal performs the network map matching on the position of the user terminal when the requested task is the route search. Hereinafter, the space map matching will be described.

Figure 2:
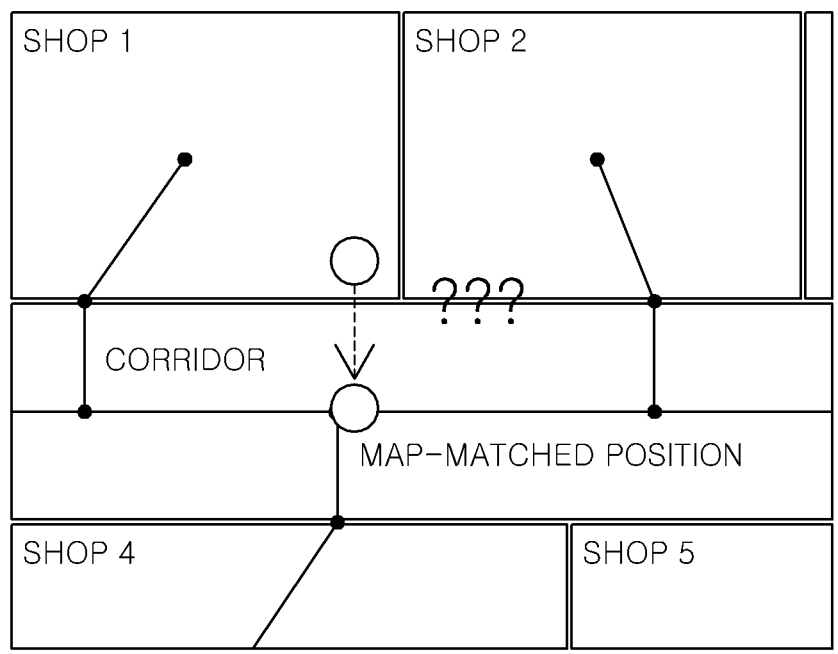
FIG. 2 illustrates a situation where there is a need to perform a space map matching.

The space map matching means to match a real position of the user terminal, which is measured, within a specific space. In other words, the space map matching refers to a process of matching the just measured position of the user terminal to a position within a particular space that is determined, without moving the measured position to a position on a network. For example, in FIG. 1, the position of the user terminal measured by a positioning device is indicated by a triangle, and the position of the user terminal is marked at a real position that is indicated by the triangle. FIG. 2 illustrates a situation where there is a need to perform the space map matching in accordance with an embodiment of the present invention. Referring to FIG. 2, if it does not consider a space concept, even though a user is currently located at a SHOP 1, the position of the user would be map-matched to a link formed in a corridor through a network map matching. Moreover, if the user is located at a space where the SHOP 1 and a corridor are separated by a wall, the user may experience an unacceptable map matching result. Therefore, the concept of a space is a method to match positioning data to be within a specific area of an indoor space and is efficient to determine whether which space a user or a user terminal is really located in.

Figure 3:
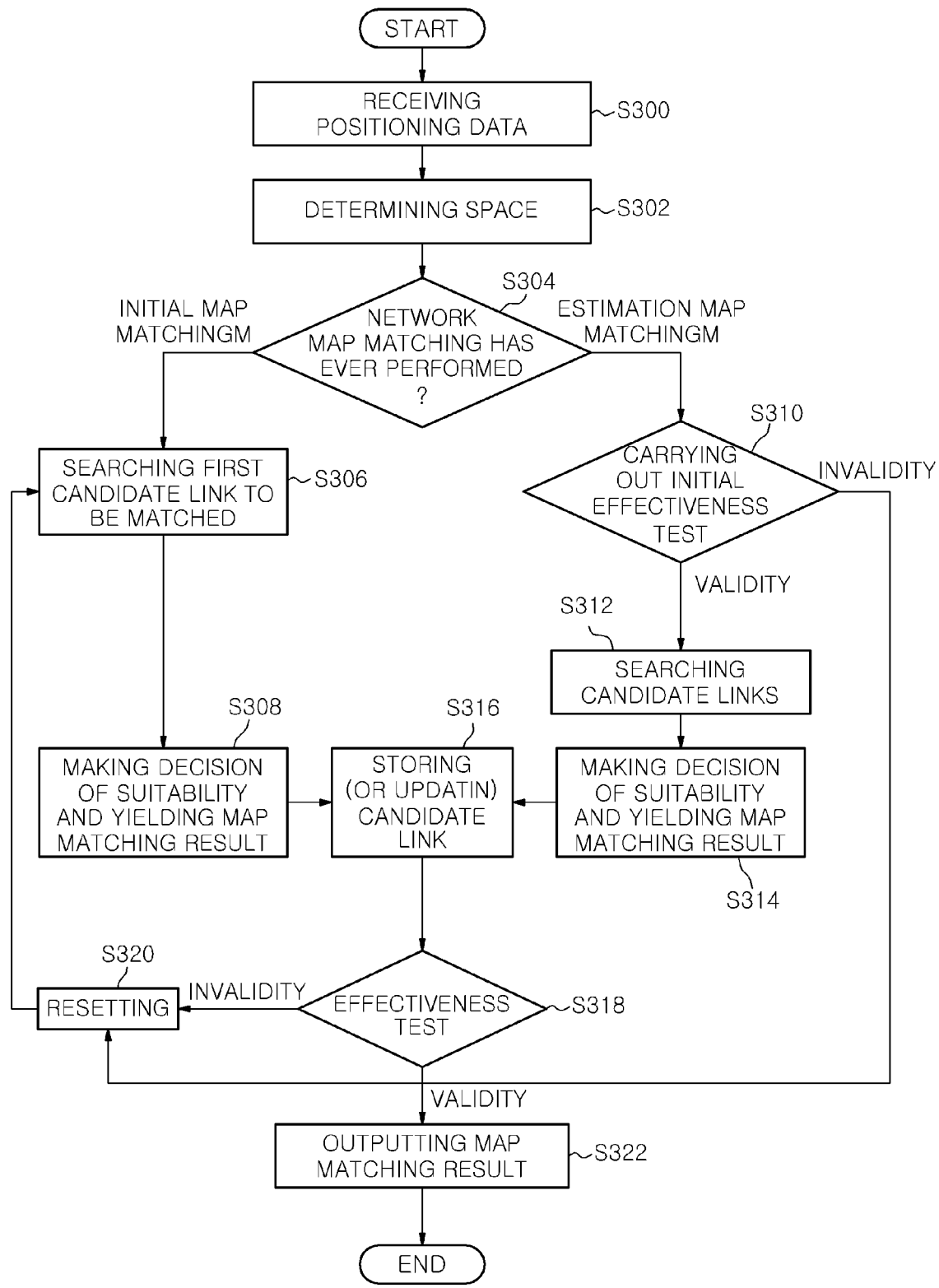
FIG. 3 is a flowchart schematically illustrating a method of performing a map matching in a user terminal in accordance with an embodiment of the present invention.

FIG. 3 is a flowchart illustrating a method of performing a map matching in a user terminal, in accordance with an embodiment of the present invention. Hereinafter, a process of performing a map matching in a user terminal will be described as follows.

In block S300, a user terminal receives positioning data. That is, the user terminal measures a position of the user terminal using a positioning device. Of course, the user terminal may receive information about its position via a separate positioning device outside the user terminal or an external server having a positioning functionality. The user terminal may measure its own position by way of communicating with an NFC (Near Field Communication) module or through the use of a QR (Quick Response) code. In addition, the user terminal may also measure its own position by way of utilizing various technologies such as a WiFi, Zigbee, Bluetooth and the like.

In block S302, the user terminal determines whether which space the position of the user terminal is located in. That is, the user terminal performs the space map matching on the position of the user terminal based on the positioning data and determines a space where the user terminal is located and spaces to which the user terminal may be movable in the future. Such a process carried out in block S302 will be described with reference to FIG. 4 later.

In block S304, the user terminal determines whether a network map matching has ever performed or not based on the positioning data. If the network map matching has not yet been made, the method advances to block S306 to perform an initial map matching based on the positioning data. However, if the network map matching has already been made, the method goes to block S310 to perform an estimation map matching based on the positioning data and a map matching result that has been made previously. The details for the initial map matching and the estimation map matching will be mentioned later. The initial map matching may be made in sequence as follows:

determining a space→extracting candidate links→performing suitability decision on the candidate links→carrying out effectiveness test.

A procedure of determining a space has already been performed in block S302 and a procedure of extracting candidate links will be explained from block S306 as follows.

In block S306, the user terminal searches one or more candidate links. That is, the user terminal searches one or more candidate links that will be subjected to the map matching.

Figure 9:
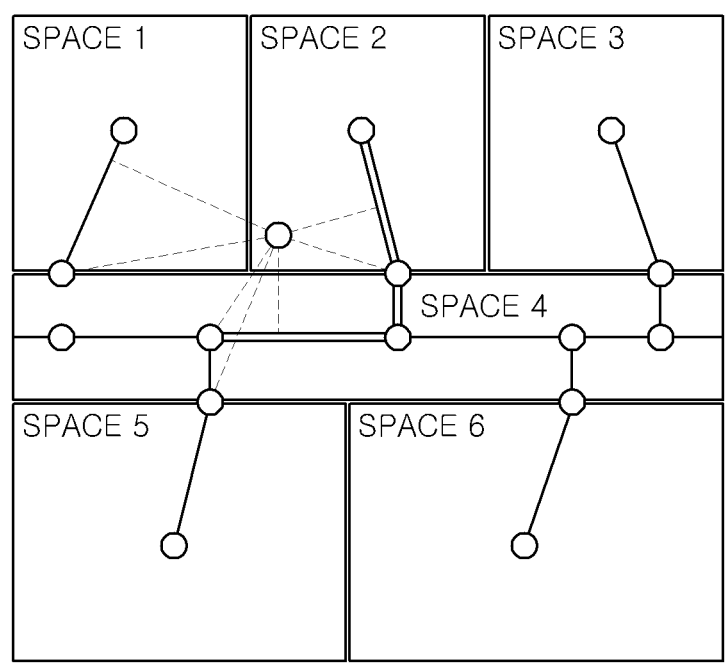
FIG. 9 is a diagram illustrating an example how to search candidate links in performing a network map matching.

Hereinafter, a process of extracting a first candidate link to be matched will be described with reference to FIG. 9. In the initial map matching process, a distance criterion is established to search the candidate links around the positioning data. While the embodiment describes to search the candidate links within a range of 10 m (on a distance basis) based on the positioning data, it is not limited thereto. For example, the distance criterion may differ with a setting from a user or a variety of conditions.

The suitability decision and the final link extraction will be processed as follows.

In block S308, the user terminal carries out a suitability decision with respect to the candidate links. That is, the user terminal determines whether the candidate links are suitable and then selects a candidate link which has the highest suitability.

First, a suitability decision is made with respect to the respective candidate links. That is, distance suitability and space suitability are calculated with respect to each of the candidate links, a total score of the respective calculated suitability is compared with a reference score to determine whether each of the candidate links is to be registered or abolished. A final link is selected as a link having a largest suitability among the candidate links that has been registered.

During the suitability decision, when there is no link within a preset radius defined on the basis of the positioning data, the user terminal determines that this map matching is failed and then retries to perform the initial map matching. As an example, the preset radius may be about 20 m.

Next, the sequence of the estimation map matching is as follows:

determining a space→performing an initial effectiveness test→extracting candidate links→performing suitability decision on the candidate links to yield a map matching result→performing an effectiveness test.

The estimation map matching is a process capable of improving an effectiveness of the map matching by simultaneously reflecting a past map-matching record and positioning data that is currently received. However, when the positioning data that is received and the past map matching result are not effective in the course of the estimation map matching, the past map-matching record may be reset and then the initial the map matching will be resumed.

In block S310, the user terminal performs an initial effectiveness test. In the initial effectiveness test, a previous positioning data is compared to a current positioning data. When an amount of change in positions of the current positioning data relative to the previous positioning data is above a preset range, the initial effectiveness test is reset and a process returns to the initial map matching. As an example, when an amount of change in positions is more than or equal to 20 m, the initial effectiveness test is reset and the initial map matching is recommenced.

In block S312, the user terminal searches one or more candidate links. That is, the user terminal searches one or more candidate links that will be subjected to the estimation map matching. The user terminal searches a new candidate link based on the candidate links that been searched in the previous map matching. That is, the user terminal searches a new candidate link from the candidate links that been searched in the previous map matching. Among the previous candidate links, the user terminal remains one or more candidate links whose distance from the current position is below a preset distance remain as a candidate link and registers the candidate links satisfying a condition that a connecting link connected to a previous candidate link is less than or equal to a preset distance from the current position.

Thereafter, the user terminal performs the suitability decision and yields the map matching result.

In block S314, the user terminal carries out a suitability decision with respect to the candidate links. That is the user terminal calculates a score of the suitability for the respective candidate links in accordance with a criterion for the suitability decision and then selects one candidate link which has the highest suitability. That is, the user terminal decides the suitability with respect to the respective candidate links that are newly registered and selects one candidate link that has a highest score of the suitability.

The user terminal makes a decision of link suitability with respect to the respect candidate links that have been newly searched. More specifically, the user terminal calculates distance suitability, passage suitability, route suitability, connecting suitability, space suitability with respect to the respect candidate links. The user terminal compares a total score of the respective suitability for each candidate link with a preset score of a reference suitability to determine whether to remain or abolish the candidate link. In this connection, the user terminal discards any one of candidate links that are duplicated. The user terminal selects one candidate link as a final candidate link, which has a largest suitability from among the candidate links that remain the registration. It is understood that a ratio by which the space suitability occupies the total suitability score may differ with the presence or absence of the route suitability.

In block S316, the user terminal stores the selected candidate link or updates a previously selected candidate link with a newly selected candidate link.

In block S318, the user terminal carries out an effectiveness test. That is, the user terminal performs the effectiveness test on the map-matched result. When determining that the map-matched result is not effective, the user terminal initializes this map matching and resumes the initial map matching. By way of an example, when a candidate link fails to pass the space suitability and has a distance more than 10 m away from a previous positioning data and when a candidate link succeeds to pass the space suitability, but has a distance more than 20 m away from a previous positioning data, the user terminal determines that the candidate link is not effective, that is, the candidate link cannot finally pass the effectiveness test.

When the effectiveness test result indicates validity, the method goes to block S322, and otherwise, when the effectiveness test result invalidity, the method flows to block S320 where a content that has been stored in block S316 is cleared.

In block S322, the user terminal outputs a map matching result. That is, the user terminal generates a map matching result in which the position of the user terminal is map-matched to a link or a space, which has the highest suitability. Map matching result values may include space information that is determined, map-matched link information, map-matched location, and a projected distance from positioning data to a link when matching on the link. Further, the map matching location may include a map-matching location within a space before performing the network map matching and a map matching location on a link after performing the network map matching.

Figure 4:
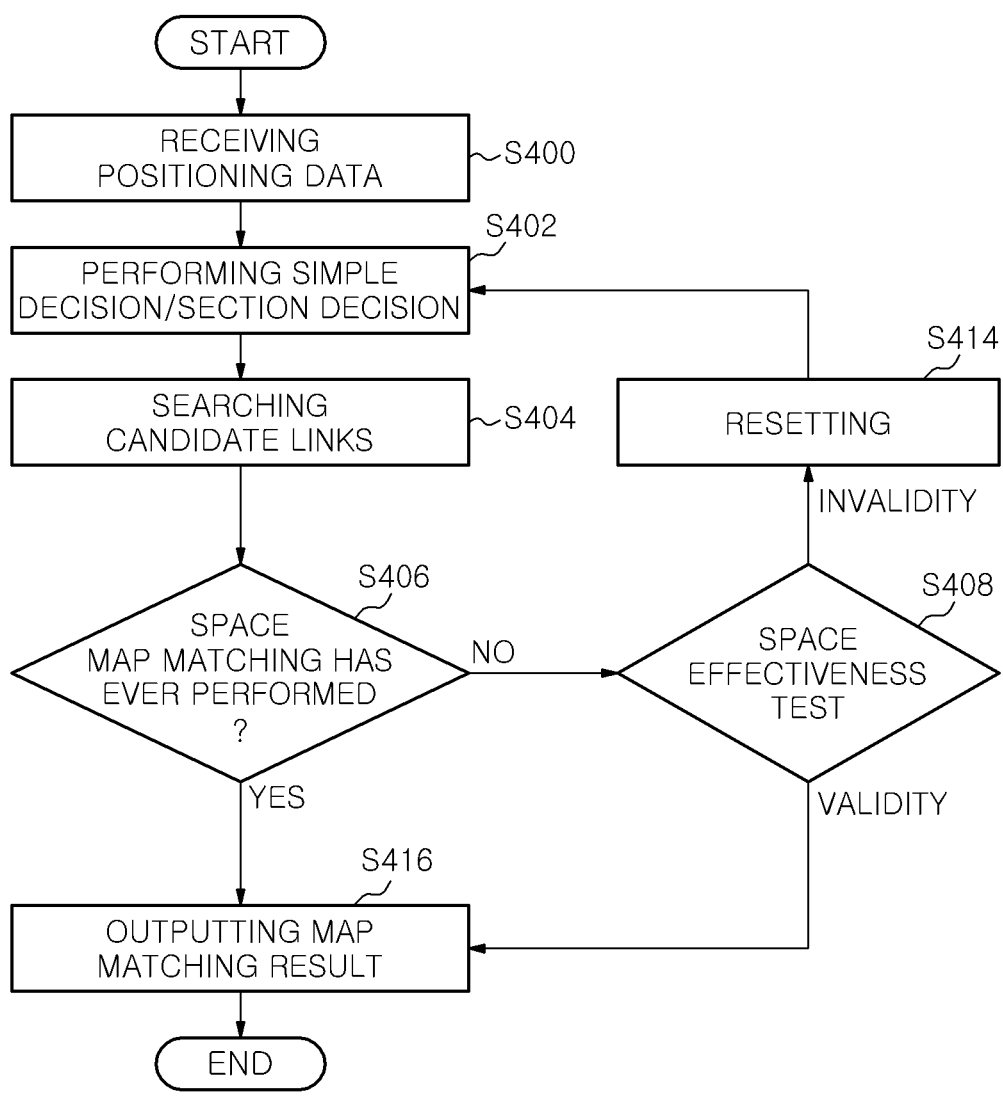
FIG. 4 is a flowchart explaining in detail a process performed in Block S302 shown in FIG. 3 in accordance with an embodiment of the present invention.

FIG. 4 is a flowchart explaining in detail a process performed in Block S302 shown in FIG. 3 in accordance with an embodiment of the present invention. Hereinafter, the process of performing a map matching in the user terminal will be described in detail with reference with FIG. 4.

In block S400, the user terminal receives positioning data. That is, the user terminal measures its own position using a positioning device. For example, the user terminal may measure its own position by way of communicating with an NFC module or through the use of a QR (Quick Response) code. In addition, the user terminal may also measure its own position by way of utilizing various technologies such as a WiFi, Zigbee, Bluetooth and the like.

In block S402, the user terminal performs a simple decision/section decision. First, the simple decision will be described as follows.

Figure 5A:
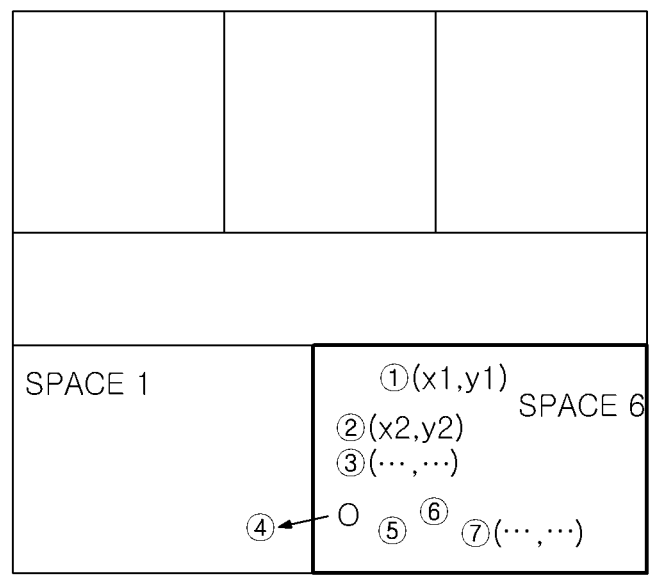

The simple decision is to detect a position of the user terminal on a time unit basis with the positioning data, which is input, as a reference. FIGS. 5A and 5B show respectively an exemplary diagram and a table explaining a simple determination in accordance with an embodiment of the present invention.

Referring to FIGS. 5A and 5B, considering in respect of the positioning data that is input, it is determined that the user terminal is located in a SPACE 6; however, only at time T4 on the table, it is determined that the user terminal is located at a SPACE 1. Nonetheless, if the user terminal has kept staying in the SPACE 6 actually, the determination made at time T4 may be wrong. Thus, in order to take account such an error, a section decision may be conducted on a basis of the simple determination in accordance with the embodiment of the present invention.

Figure 6:
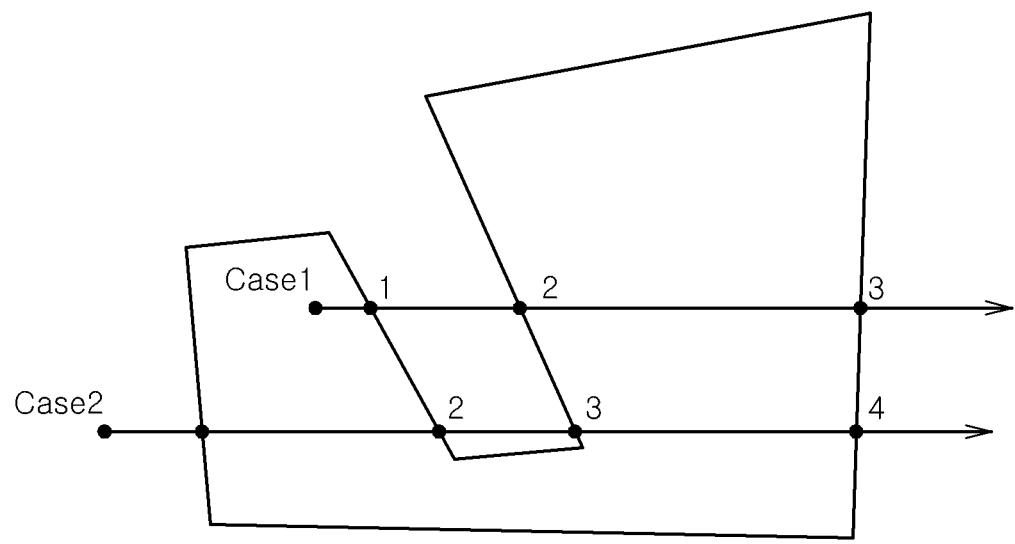
FIG. 6 is a diagram illustrating a PIP (Point In Polygon) algorithm used to determine which space a positioning of a user terminal is located in in accordance with an embodiment of the present invention.

FIG. 6 is a diagram illustrating a PIP (Point In Polygon) algorithm used to determine which space the user terminal is located in.

In FIG. 6, a half line, which starts with one point, is created to pass through a polygon. After that, it is determined whether the point is located within the polygon from the number of intersections between the half line and the polygon.

When the number of intersections is an odd number, it is determined that the point is located within the polygon, and otherwise when the number of intersections is an even number, it is determined that the point is located outside the polygon.

With the foregoing in mind, referring to FIG. 6, for a first point CASE 1, since the number of intersections is three, which is an odd number; therefore, the point is determined to be within the polygon. For a second point CASE 2, since the number of intersections is four, which is an even number; therefore, the point is determined to be out of the polygon.

Now, the section decision will be described as follows. The section decision is a method to carry out the simple decision on a section basis in order to make up for a matching error which may occur in the simple decision.

Figure 7A:
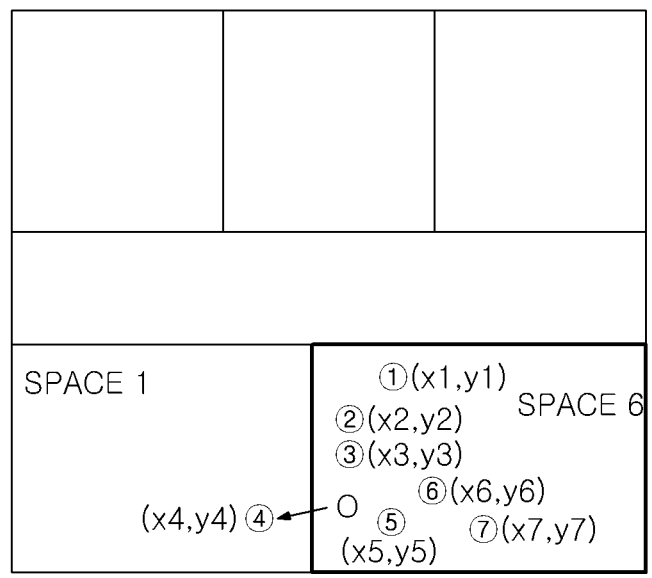

FIGS. 7A and 7B are respectively a diagram and a table showing an example making a section decision in the user terminal. The section decision ties each specific number of simple decision results in one section to yield the greatest value (or the highest frequency) in each section as a final result. Referring to FIGS. 7A and 7B, for example, when a set of three positioning data is grouped into one section, the position of the user terminal will be determined to be stayed in a SPACE 6 at time T4. That is, a space where the user terminal is located at time T4 may maintain the same space where the user terminal has been located at time T3. Of course, the position of the user terminal in the corresponding space may differ actually. Both the simple decision and the section decision may consider an accuracy, accumulated direction information, etc. as well as the positioning data.

In block S404, the user terminal searches one or more candidate spaces, and if needed, stores the candidate spaces.

After searching the candidate spaces where it is expected that the user terminal is located through the section decision approach, a space effectiveness test is conducted for each of the candidate spaces.

Figure 8:
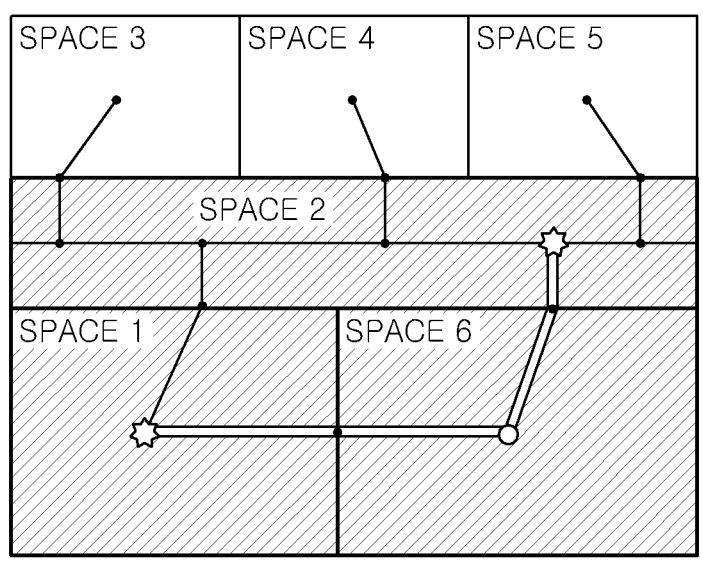
FIG. 8 is a diagram illustrating an example how to search candidate spaces in performing a space map matching.
Figure 8:
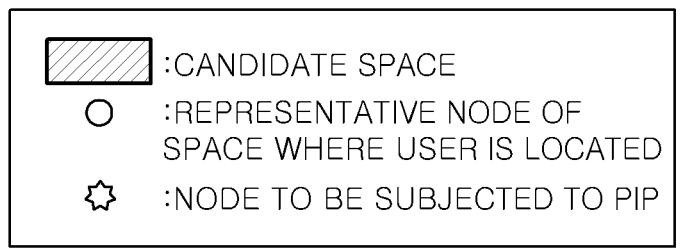

As illustrated in FIG. 8, when it is determined that the position of the user terminal is located in a SPACE 6 through the use of the section decision, a space where the user terminal is expected to be moved may be a SPACE 2 and a SPACE 1, which have a connectivity with a space where the user terminal is currently located, inclusive of the SPACE 6.

A novel method for deriving one or more candidate spaces is proposed by an embodiment of the present invention and is described as follows:

1. Detecting a space where a user is located through the use of simple & section decisions based on positioning data;
2. Spawning network data starting from a representative node of the space detected by the step 1;
3. Carrying out a PIP (Point in Polygon) test of an end node of the link that is spawned (on a basis of a spawning direction);
4. Searching a space including the end node of the link that is spawned through the PIP test and storing the searched space if the corresponding space is different from the space where the user is located; and stopping the spawning in the direction of the search.
5. Carrying out the step 4 on a connecting link direction basis. But, if an attribute of the end node of the link considering the spawning direction has "a door node", the spawning is performed to search for a next connecting link without passing through the PIP test.

In block S406, the user terminal checks whether the space map matching has ever been performed. When it is checked that none space map matching has been made, the user terminal performs the initial map matching based on the positioning data, and otherwise, when it is checked that the space map matching has already been made, the user terminal performs the estimation map matching based on the positioning data and a previous map matching result.

In block S408, the user terminal checks a space effectiveness test. If there is an existing result for deriving a candidate space, the user terminal may check whether a currently searched space is an effective space base on the existing result. That is, a candidate space that is searched on a basis of the connectivity of a currently matched space becomes a subject to be checked. Therefore, another space except the candidate space, which is determined as a result of the search, cannot pass through the space effectiveness test.

In block S414, the user terminal resets this space map matching when it is determined that the matched space is not effective.

In block S416, the user terminal yields a space map matching result. Values of the space map matching result may include map-matched space information such as an ID, map-matched coordinates in the map-matched space, and the like. Further, the map matching location may include a map-matching location within a space before performing the network map matching and a map matching location on a link after performing the network map matching.

Hereinafter, individual suitability will be described separately in detail.

Figure 10:
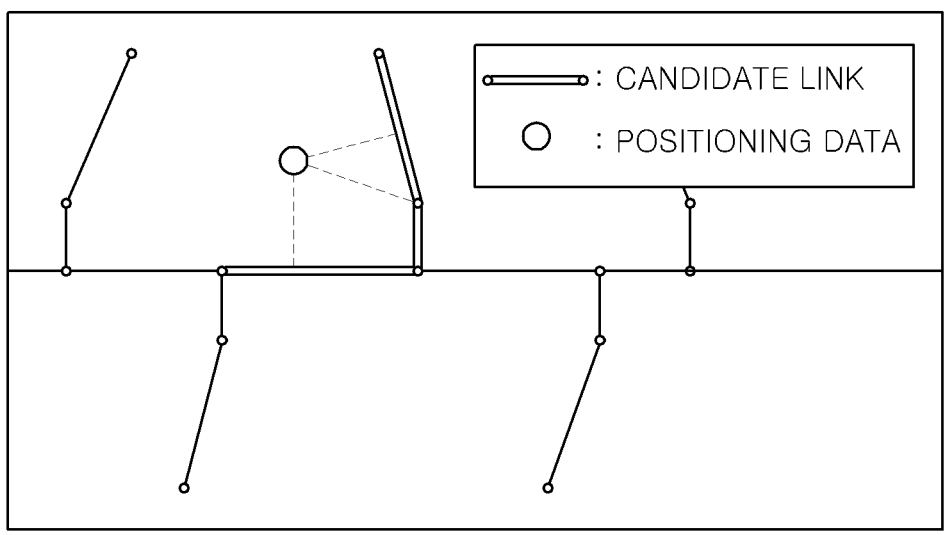
FIG. 10 is a diagram illustrating another example how to search candidate links in performing a network map matching.
Figure 11:
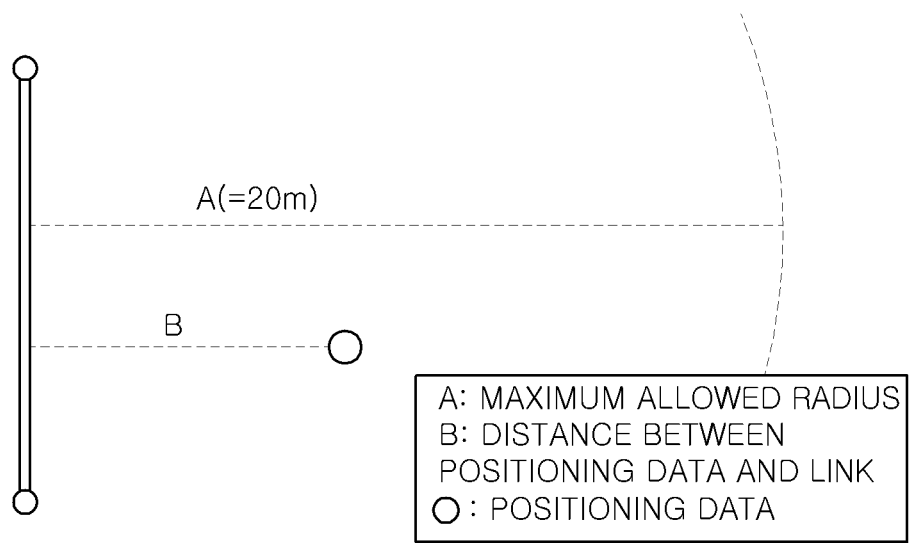
FIG. 11 is a diagram illustrating distance suitability.

FIG. 10 is a diagram illustrating an example of searching candidate links; and FIG. 11 is a diagram illustrating the distance suitability in accordance with an embodiment of the present invention.

The distance suitability considers a distance between the positioning data and the respective candidate links. By way of example, a largest radius for the distance suitability is set within a range of 20 m. A score of the distance suitability may be calculated in consideration of a ratio deviated from a link with reference to a maximum allowable radius and a largest score of the distance suitability.

The passage suitability is calculated by comparing passage codes of a link and a traveling direction of the link.

The route suitability considers whether positioning data presents on a route that is searched if the searched route exist.

Figure 12:
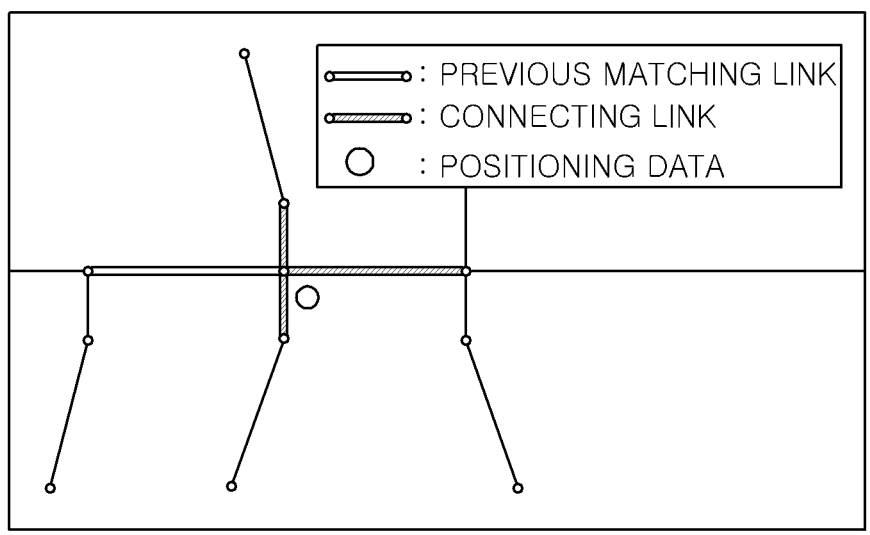
FIG. 12 is a diagram illustrating connection suitability.

The connecting suitability considers whether a previous matching link has a connecting link. FIG. 12 is a diagram expressing the connecting suitability.

The space suitability considers whether a space is available for moving.

While the present invention has been shown and described with respect to the preferred embodiments, the present invention is not necessarily limited thereto. It will be easily appreciated by those skilled in the art that various substitutions, changes and modifications may be made within a scope without departing from the technical idea of the invention.

What is claimed is:

1. A method for performing a map matching in a user terminal, the method comprising:
    determining a space where the user terminal is located using positioning data that is measured at predetermined time intervals;
    searching one or more links that are located within a range of a preset distance from the space as a candidate link;
    selecting one of the candidate links which best meets at least one suitability criterion of at least two suitability criteria including distance suitability and space suitability; and
    carrying out the map matching with respect to the selected one candidate link, wherein said selecting one of the candidate links comprises:
    determining whether a distance between a position of the user terminal, which is determined from a previously measured positioning data, and a position of the user terminal, which is determined from a currently measured positioning data, falls within a range of a preset distance; and
    when the distance falls within the range of the preset distance, selecting either the candidate links which are derived through the use of the previously measured positioning data or connecting links of the candidate links as the candidate link, wherein the selected candidate links or the selected connecting links meet a preset condition.

2. The method of claim 1, wherein said determining a space where the user terminal is located comprises:
    determining whether the user terminal moves to another space from the space, which is measured at the predetermined time intervals, where the user terminal is located;
    determining whether the user terminal moves from another space where the user terminal is located to the space where the user terminal has been located previously within the predetermined time intervals; and
    when it is determined that the user terminal moves, accumulating at least three positioning data measured at predetermined time interval to determine whether which space the user terminal is located in.

3. The method of claim 1, wherein said determining a space where the user terminal is located comprises:
    accumulating at least three positioning data measured at predetermined time interval to determine whether which space the user terminal is located in.

4. The method of claim 2, further comprising:
    determining whether there is a record which has determined a space where the user terminal is located; and
    when it is determined that there is the record, determining whether the space that is determined that the user terminal is located has a connectivity with the space where the user terminal has been located previously.

5. The method of claim 1, wherein the selected candidate links or the selected connecting links meet a preset condition comprises:
    the candidate links which are located within a range of preset distance from a position that is determined from currently measured positioning data or connecting links of the candidate links.

6. The method of claim 1, wherein the suitability criterion comprises at least one of:
    distance suitability to determine a distance from the position of the user terminal to a candidate link;
    a space suitability to determine whether the position of the user terminal is movable to a candidate link;
    a route suitability to determine whether the position of the user terminal, which is measured using the positioning data, is located on a route;
    a passage suitability to define passage codes of a link and a traveling direction of the link; and
    a connection suitability to determine whether a previous candidate link has a candidate link.

7. The method of claim 1, further comprising:
   after said performing a map matching, displaying a map matching result,
   wherein the map matching result comprises information about the space that has been determined and information about the link that has been matched.

8. The method of claim 7, wherein the map matching result comprises at least one of:
   a matching location within the space that has been determined;
   a location of the matched link; and
   a distance between the matched location within the space and a location of the matched link.

* * * * *